United States Patent [19]
Warner et al.

[11] 3,959,008

[45] May 25, 1976

[54] CARBON BLACK

[75] Inventors: Amos C. Warner; Chalmes V. Williams, both of Monroe, La.

[73] Assignee: Cities Service Company, Tulsa, Okla.

[22] Filed: June 24, 1974

[21] Appl. No.: 482,127

[52] U.S. Cl............................. 106/307; 423/445; 423/450
[51] Int. Cl.$^2$........................................ C09C 1/48
[58] Field of Search ............ 106/307; 423/445, 450; 34/31; 432/13, 18

[56] References Cited
UNITED STATES PATENTS

| | | | |
|---|---|---|---|
| 3,301,694 | 1/1967 | Kraus et al. | 106/307 |
| 3,436,240 | 4/1969 | Rogers, Jr. et al. | 106/307 |
| 3,565,657 | 2/1971 | Dannenberg et al. | 106/307 |
| 3,574,547 | 4/1971 | Hinson, Jr. | 106/307 |

*Primary Examiner*—Winston A. Douglas
*Assistant Examiner*—J. V. Howard
*Attorney, Agent, or Firm*—Elton F. Gunn

[57] ABSTRACT

Oxygenated furnace black products are disclosed which have a particle size of at least 15 millimicrons, a dibutylphthalate absorption (DBP) not exceeding 120 c.c./100 gms., a nitrogen surface area of at least 450 m$^2$/gm., and an oxygen content of at least 4 weight percent.

These products can be produced by treating a furnace carbon black feedstock with an oxidizing agent, such as nitric acid, in order to substantially increase the volatile and the oxygen content of the black.

21 Claims, 3 Drawing Figures

CARBON BLACK

BACKGROUND OF THE INVENTION

This application pertains to carbon black and more particularly pertains to carbon blacks which are especially useful as an ingredient in xerographic toner compositions.

It is well known that carbon blacks are included in xerographic toner compositions in order to impart a black color and other desirable properties to the toner. In the past, medium to high color channel blacks that are produced from natural gas were the carbon blacks of choice for toner formulation since they imparted the best balance of properties to toners which contained them.

More recently, however, it has become apparent that production of channel blacks will have to be further curtailed, if not completely eliminated, not only because of the deminishing supply of natural gas, but also because of increasing manufacturing and marketing costs. Therefore, in order to assure a continuing supply of carbon blacks for use in xerographic toner compositions, it became imperative that they be produced from oil feedstocks instead of natural gas, e.g. via an oil furnace process instead of a channel process.

OBJECTS OF THE INVENTION

It is therefore an object of this invention to provide carbon blacks which are suitable for use in xerographic toner compositions.

Another object of this invention is to provide a carbon black for xerographic toner compositions which is produced from oil instead of natural gas.

Even another object is to provide a method for producing oxygenated oil furnace blacks which are suitable for imparting highly desirable properties to a xerographic toner.

Other objects and advantages of the present invention will become apparent from the following description and the appended claims.

SUMMARY OF THE INVENTION

Broadly, the oxygenated carbon blacks of the present invention have a particle size (arithmetic mean diameter) of at least 15 millimicrons, a dibutylphthalate absorption (DBP) not exceeding 120 c.c./100 grams., a nitrogen surface area of at least 450 $m^2/gm.$, and an oxygen content of at least 4 weight percent. More specifically, these carbon blacks will have a particle size within the range of 15 to 60 millimicrons, a dibutylphthalate absorption (DBP) within the range of 60 to 120 c.c./100 gms., a nitrogen surface area within the range of 450 to 1000 $m^2/gm.$, and an oxygen content of 4–10 weight percent. A specific example of a carbon black product of this invention is one having a particle size of about 30 millimicrons, a dibutylphthalate absorption (DBP) of about 100 c.c./100 gms., a nitrogen surface area of about 500 $m^2/gm.$ and an oxygen content of about 6 weight percent.

The oxygen content of the present carbon black products is determined by analysis of their volatile content (moisture free), and the content of volatile of a number of products of the present invention which were examined was 6 weight percent or higher, and generally within the range of 6.5 to 16.5 weight percent.

Furnace carbon blacks which are herein referred to as "feedstock carbon blacks" and are oxygenated to provide the xerographic toner blacks have particle size, DBP and nitrogen surface area properties which are not far removed from those of the oxygenated blacks. However, they are quite different from the oxygenated blacks in having a much lower volatile and oxygen content. Broadly, the volatile content of these blacks, prior to treatment for combination with oxygen, is no greater than about 3 weight percent, more preferably about 1 to about 2 weight percent, and advantageously about 1.5 weight percent. Since the oxygen content of these blacks is no more than about 60–80% of the total volatile content, it can thus be appreciated that the oxygen content thereof is within the range of less than 1 to about 2.5 weight percent.

Further regarding the feedstock carbon blacks, they can have particle size and surface area properties which differ slightly from those defined above for the oxygenated toner product. In the broadest and the most specific sense the surface area can be at least 500 $m^2/gm.$, since some loss of surface area can be encountered during treatment of the feedstock black to increase the oxygen content thereof. Pointing to a specific example of the feestock black, the surface area can be about 575 $m^2/gm.$ With regard to the particle size of the feedstock black, it can advantageously be 20–45 $m\mu$, more advantageously 20–30 $m\mu$, and most specifically 25 $m\mu$.

Therefore, in producing the oxygenated carbon black products of the present invention, a feedstock carbon black having a relatively coarse particle size and high surface area is produced which has the approximate particle size, DBP absorption and nitrogen surface area desired of the finished product, but with a relatively low oxygen content, e.g. only one-fourth or less of the oxygen content ultimately desired. The additional oxygen content, essential to proper performance of the black in a xerographic toner, can be obtained by combining the produced feedstock carbon black with oxygen made available from an oxydizing treating agent such as ozone or nitric acid, advantageously the latter.

The feedstock carbon blacks which are treated to produce the oxygenated products of the present invention can be made in accordance with an improved method which resides in prior oil furnace processes wherein a liquid stream of carbon black feedstock hydrocarbon is injected into a reaction chamber of a carbon black furnace and a portion of the feedstock hydrocarbon is burned with free oxygen in the reaction chamber. Hot combustion gases are produced by the burning of the feedstock hydrocarbon, while the remainder of the feedstock hydrocarbon is thermally decomposed by absorption heat from the hot gases thus formed. An aerosol is formed of carbon black suspended in the combustion gases and gaseous products formed by thermal decomposition of the hydrocarbon, and the carbon black is then separated and recovered from the gaseous constituents of the aerosol.

To obtain feedstock carbon blacks which can be oxygenated to provide the presently claimed products, a modified version of the prior art process just described can be used. More specifically, a stream of liquid water can be injected into the liquid carbon black feedstock stream after injection of the feedstock into the furnace reaction chamber. The liquid water is injected into the feedstock stream while the feedstock is still substantially in a liquid phase but after heating of the feedstock stream to a temperature which is substantially in excess of the water stream that is injected into it. The mixture which results from injection of the water stream into the feedstock hydrocarbon stream is immediately burned after the formation thereof. In addition, the burning of the mixture of feedstock hydrocarbon and injected water can be carried out in a section of the furnace reaction chamber while is maintained at a temperature of at least 2600°F., and advantageously within the range of 2600°F. to about 3000°F. This particular method for producing the feedstock carbon blacks is disclosed in more detail in copending application Ser. No. 482128, filed June 24, 1974, and assigned to the same assignee as this application. Other method for producing the feedstock carbon blacks can be used where such is preferable and practical.

TREATING METHOD FOR OXYGENATING THE FEEDSTOCK BLACKS

The feedstock carbon blacks are oxygenated to provide carbon blacks for xerographic toners by combining the feedstock blacks with oxygen so as to increase the oxygen content thereof to a level of at least 4 weight percent, and more preferably to 4 to 10 percent. To effect the oxygenation thereof, the feedstock carbon blacks can be brought into contact with suitable oxidizing agents such as ozone or oxides of nitrogen selected from the group represented as $N_xO_y$ and wherein $x$ is from 1 to 2 and $y$ is from 1 to 4, e.g. $N_2O$, $NO$, $N_2O_3$, $NO_2$ and $N_2O_4$. Such oxides of nitrogen can be made available in any suitable manner, e.g. by heating a mixture which comprises a feedstock carbon black and a concentrated aqueous solution of nitric acid.

While this treatment method provides the increase in oxygen content sought for the oxygenated black, it also results in an increase in the total volatile content so that the latter is generally higher than the oxygen content. Therefore, the term "oxygenated" as used herein comprises compounds of oxygen with other elements as well as molecular oxygen.

Preferably, nitric acid is used as an oxygenating agent, using a weight ratio of nitric acid to black of about 1/1, while employing an aqueous solution of nitric acid wherein the concentration of acid is at least about 50 weight percent and preferably higher. Reaction temperature, to effect evaporation of moisture, liberation of oxides of nitrogen and combination of the oxides with the carbon black, should be maintained relatively low, e.g. 250°–300°F. It will be appreciated that the treatment conditions just described are exemplary, and that different oxidizing agents and treating conditions can be employed, where preferable and practical, for increasing the oxygen content of the feedstock carbon blacks to effect the oxygenated products.

The following tables and written description provide further description of the present invention in greater detail.

| | Oil Furnace Blacks Which Can Be Oxygenated to Produce the Products of the Present Invention | | | | |
|---|---|---|---|---|---|
| | Particle Size | DBP | Surface Area | Oxygen Content | Volatile Content |
| In the broadest sense | at least 15 | not over 120 | at least 500 | not over about 2.5 | not over 3 |
| More specifically | 15–60 | 60–120 | 500–1000 | about .6–2 | 1–3 |
| Advantageously | 20–45 | 80–120 | 500–700 | about .6–1.5 | about 1–2 |
| More Advantageously | 20–30 | 100–120 | about 500–600 | about .6–1.5 | about 1–2 |
| Specific example | about 25 | about 110 | about 575 | about 1 | about 1.5 |

| | Oxygenated Oil Furnace Blacks of the Present Invention | | | | |
|---|---|---|---|---|---|
| | Particle Size | DBP | Surface Area | Oxygen Content | Volatile Content |
| In the broadest sense | at least 15 | not over 120 | at least 450 | 4 or greater | at least 6 |
| More specifically | 15–60 | 60–120 | 450–1000 | 4–10 | 6.5–16.5 |
| Advantageously | 25–50 | 80–120 | 500–700 | 6–8 | about 7–13.5 |
| More advantageously | 25–35 | 100–120 | about 500–600 | 5–7 | about 7–10.5 |
| Specific example | about 30 | about 100 | about 500 | about 6 | about 9.5 |

| | Prior Thermal Blacks, Industrial Oil Furnace Blacks and Channel Blacks, Digested Data From Examination of a Full Spectrum Comprising 30 Previously Available Grades | | | | |
|---|---|---|---|---|---|
| | Particle Size | DBP | Surface Area | Oxygen Content | Volatile Content |
| Where particle size was at least 15 | 16–300 | 35–115 | 10–275 | 0.35–3.2 | 0.5–4.9 |
| Where DBP was not over 120 | 16–300 | 35–115 | 10–275 | 0.35–3.2 | 0.5–4.9 |
| Where surface area was at least 450 | 10–14 | 145–229 | 695–1125 | 7.4–11.6 | 10.5–16.5 |
| Where oxygen content was at least 4 | 10–14 | 145–229 | 695–1125 | 7.4–11.6 | 10.5–16.5 |
| Where volatile content was at least 6 | 10–14 | 145–229 | 695–1125 | 7.4–11.6 | 10.5–16.5 |
| Where volatile content was no greater than 3 | 17–300 | 18–112 | 10–245 | 0.35–1.5 | 0.5–2.2 |

TEST PROCEDURE FOR DETERMINING PROPERTIES OF PRODUCTS PARTICLE SIZE

Arithmetic mean particle diameter is determined from the method described in "Encyclopedia of Industrial Chemical Analysis", Volume 8, John Wiley and Sons, Inc., 1969.

DIBUTYLPHTHALATE ABSORPTION (DBP)

ASTM procedure.

NITROGEN SURFACE AREA

As determined by the well-known method of Bauer, Emitt, and Teller (BET), "Encyclopedia of Industrial Chemical Analysis", supra.

VOLATILE CONTENT

ASTM procedure.

OXYGEN CONTENT

When carrying out the test to determine volatile content, the gases which are driven off of the black during heating are carefully collected so as to prevent contamination with air. These collected gases are then analyzed by conventional gas chromatography techniques to determine the percent of oxygen content therein. Once the oxygen content of the collected gas is known, the oxygen content of the carbon black sample, in weight percent, can then be determined.

REMARKS REGARDING DIFFERENCES BETWEEN PRESENT AND PRIOR ART PRODUCTS

As can be seen from the above tables, the present carbon black products are characterized by a contamination of properties that is distinctly different from those exhibited by carbon blacks of the prior art. Whereas prior art blacks have exhibited particle sizes and DBP values within the range of the presently claimed products, they have nonetheless also exhibited markedly lower surface area, oxygen content and volatile content. Conversally, when the carbon blacks of the prior art exhibited volatile content, oxygen content and surface area within the range of the presently claimed products, they have at the same time exhibited lower particle size and markedly higher surface areas.

Since the data for present and prior art blacks that is presented above includes test results from a spectrum of 30 different previously known grades of carbon black, the considerable disparity in combined properties of the present and prior art products emphasizes the novelty thereof. Furthermore, there was not a recognized, suggested, or apparent need for a carbon black having properties of those presently claimed. If it were otherwise, there would not be such a difference between the carbon blacks of the prior art and those presently claimed.

PROCESS FOR PRODUCING FEEDSTOCK CARBON BLACKS THAT ARE OXIDIZED TO PROVIDE OXYGENATED PRODUCTS

Feedstock carbon blacks which can be oxidized to provide the products of the present invention can be produced by means of the oil furnace processes disclosed in the aforementioned application Ser. No. 482128, filed June 24, 1974, and hereby incorporated by reference. Accordingly, a stream of carbon black feedstock hydrocarbon is injected into a furnace and the feedstock is vaporized and pyrolized to form carbon black by absorption of heat from hot combustion gases contained within the furnace. The hot combustion gases can be produced either by burning a portion of the carbon black feedstock itself with oxygen or a separate fuel such as natural gas or an oil can be burned. Oxygen for the burning is made available by mixing the fuel with air, oxygen-enriched air, pure oxygen or the like. The feedstock hydrocarbon is injected as a liquid stream into the highly heated furnace and a stream of liquid water is then injected into the feedstock while the latter is being mixed with free oxygen, but before it becomes substantially vaporized. More specifically, the injected water is forced into a hot feedstock stream in the presence of oxygen while the feedstock is still substantially in a liquid phase but is nonetheless heated to a temperature considerably beyond that of the liquid water that is injected into it.

The amount of liquid water that is injected into the liquid feedstock stream is subject to considerably variation but it has been determined that satisfactory results are obtained when the volume ratio of feedstock hydrocarbon to water is within the range of about 3/1 to about 10/1 when both are measured at 60°F. More specifically, a ratio within the range of about 4/1 to about 6/1 is employed.

As was previously indicated the temperature of the liquid feedstock stream is relatively much hotter than the temperature of the liquid water stream when the two streams collide. More specifically, the temperature differential, $\Delta T°$, of the two streams can be within the range of about 300°F. to about 700°F., and the differential can be even higher provided that most of the feedstock stream is still in a liquid form and no substantial formation of carbon black has occurred when the two streams intersect. Therefore a liquid stream of feedstock hydrocarbon having a mean boiling point of about 750°–800°F. can thus be heated to a temperature of about 500° to 800°F. when intersected by a stream of liquid water having a temperature within the range of about 100° to 200°F.

To facilitate the development of feedstock carbon blacks having high surface areas, high temperatures can be employed in the section of the furnace where the mixture of feedstock hydrocarbon and injected water is burned. More specifically, temperatures in this particular section of the furnace can be maintained at a temperature of at least 2600°F., and preferably within the range of 2600°F. to about 3000°F. To advantage, the furnace reaction chamber can be vertically elongated, with the feedstock hydrocarbon and air streams being introduced axially upward into a lower section of the chamber. Accordingly, a portion of the feedstock hydrocarbon is burned in the lower section of the furnace as fuel during burning of the mixture for producing the hot combustion gases within which the unburned portion of the feedstock hydrocarbon is thermally decomposed, with thermal decomposition of the remainder of the feedstock occurring within a blanket which resides in an upper section of the reaction chamber.

With reference to FIGS. 1 and 2 of the drawing, the invention will now be described with respect to an oil furnace process whereby the aforementioned relatively coarse, high surface area feedstock carbon blacks are produced.

Figures 1, 2:
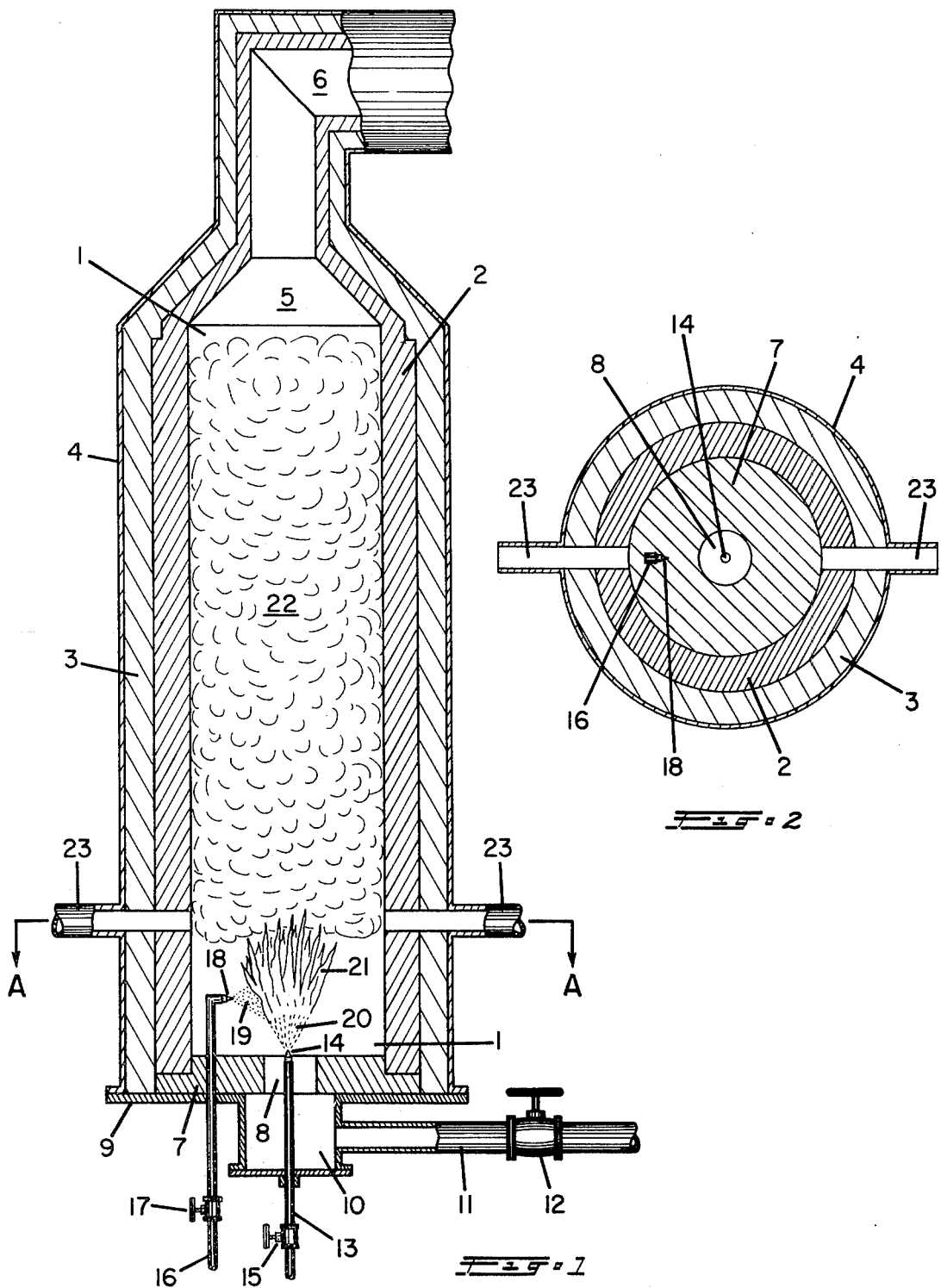
FIG. 1 is a sectional side view of a vertically elongated cylindrical furnace that can be used to produce feedstock carbon blacks which can be oxygenated in accordance with the present invention.
FIG. 2 is a cross-sectional view of the furnace of FIG. 1 taken along the line A — A of FIG. 1 and shown in a somewhat smaller scale.

The cylindrical reaction chamber or carbon black formation zone 1 of the furnace is surrounded by a refractory wall 2, a layer of insulation 3, and an outer metal sheath 4. The furnace has a conical top section 5 which connects with a breeching 6. The brreeching leads into a cooler and then into a conventional separatory system, neither of which is shown. The carbon black aerosol is quenched with water in the cooler and the carbon black is then separated and recovered from the aerosol by means of the separatory system.

The bottom of the furnace has a refractory floor 7 with a central opening 8 which leads into chamber 1. The floor 7 is supported by a bottom plate 9 which is attached to the sheath 4. An air box 10 is attached to the bottom plate 9 and is aligned over the floor opening 8 so that air which is blown into the box 10 through conduit 11 is discharged upwardly into chamber 1. The flow of air through conduit 11 and into the furnace is controlled by means of a valve 12.

Liquid feedstock hydrocarbon is injected into the furnace chamber by means of a sprayer 13 having an atomizer tip 14 and a flow-control valve 15. Another sprayer 16 extends through the floor 7 of the furnace and into chamber 1 and is provided with a flow-control valve 17 and an atomizer tip 18. Sprayer 16 is used to inject a stream of liquid water 19 into the stream of liquid feedstock hydrocarbon 20 that is injected into the furnace. The atomizer tip 18 is directed perpendicularly with respect to the axis along which the feedstock hydrocarbon is discharged from atomizer tip 14, thereby assuring intersection of the liquid water stream 19 and the liquid feedstock stream 20. It is preferably that both the feedstock sprayer 13 and the water sprayer 16 be adjustable along their longitudinal axes to permit altering of the location at which the water and feedstock streams intersect within chamber 1.

In operation, air, feedstock hydrocarbon and water are fed into the furnace at substantially constant, preestablished rates through conduit 11 and the sprayers 13 and 16 respectively. Ignition of the resulting mixture following collision of the water stream 19 and the hydrocarbon stream 20 in the presence of air entering the furnace through floor opening 8 results in formation of flame 21 above the floor 7 of the furnace. The flame is caused by combustion of part of the feedstock hydrocarbon stream 20 with the entering air and is initiated and promoted by injection of the water stream 19, as previously described. As the unburned portion of the feedstock hydrocarbon continues to travel upward in chamber 1, it becomes mixed with hot combustion gases produced by the flame and is thereby further vaporized and pyrolyzed by absorption of heat from the hot gases. A blanket 22 is formed in the upper part of chamber 1 and consists of carbon black, partially decomposed hydrocarbons from the feedstock, hot combustion gases, and gaseous products which result from pyrolysis of the feedstock.

Temperatures within the furnace reaction chamber are maintained within the range of about 2300°–3000°F. Injection of water into the furnace in accordance with the present invention is insufficient to cause any significant overall quenching effect, but can cause a substantial alteration of the temperature profile along the length of the furnace chamber.

The effluent from the furnace which enters breeching 6 is an aerosol of carbon black suspended in gaseous products of combustion and thermal decomposition of the feedstock hydrocarbon. Since the reaction chamber 1 is elongated and highly heated, the carbon black of the effluent aerosol will contain little if any oily residue (stain) from pyrolysis of the feedstock, i.e. thermal decomposition of the feedstock can be carried essentially to completion within the reaction chamber. To facilitate the development of high temperatures within the reaction chamber 1, auxiliary air can be introduced at controlled rates through conduits 23 for burning of combustible gaseous products of the pyrolysis reaction which reside in the blanket 22.

As was previously indicated, the temperature in the lower section of the furnace reaction chamber should be maintained at a temperature of at least 2600°F. where burning of the mixture of feedstock hydrocarbon and water takes place. This can be accomplished by directing air from conduits 23 into the mixture, using a rate and amount of air which further intensifies the burning. More particularly, the flow rates and mixing of primary and secondary air, feedstock hydrocarbon and water should be established in such a fashion as to provide temperatures in the lower end of the chamber which are at least 2600°F., preferably 2600° to about 3000°F. Temperatures in the middle section of the furnace reaction chamber can range upwards from 2600°F, whereas somewhat lower temperatures can be maintained in the top section, e.g. 2200°–2400°F., and preferably about 2300°F.

Although not wishing to be bound by theory, the following explanation is offered in an attempt to explain why relatively coarse blacks having high surface areas are produced by means of the present process. It is felt that in the distance between the atomizer tip 14 and the water stream 19, the feedstock hydrocarbon 20 is partially vaporized while the initial stages of the reaction for forming carbon black begins, all within a time period of only a few miliseconds. The water stream 19 slows down the reaction of heavier liquid materials in the feedstock hydrocarbon which have higher carbon content and leads to selective burning of the hydrocarbon content of the lighter ends of the feedstock with oxygen introduced into the reactor. Beyond this, it is felt that introduction of the relatively cold water into the hot oil stream leads to an explosive breakup of the oil droplets by sudden vaporization of the water. The turbulence created by this effect increases the rates at which the feedstock hydrocarbon is partially burned and thermally decomposed. Further downstream, carbon black and water vapor are in contact at high temperatures which lead to a heterogeneous water gas reaction on the formed carbon particles and results in a high surface area.

TREATING METHOD FOR OXYGENATING THE FEEDSTOCK BLACKS

In a preferred embodiment of the invention, the feedstock carbon black is mixed with an aqueous solution of nitric acid and the resulting mixture is then heated in accordance with a specific method which accelerates the removal of moisture and oxygenation of the black while at the same time preserving the surface area and maximizing the oxygen content thereof. Accordingly, the mixture of feedstock carbon black and nitric acid are passed through a first enclosed heating zone and then into a second enclosed heating zone that is in open communication with the first heating zone. Heat is introduced into both of the enclosed zones as the mixture of carbon black and nitric acid pass through them, but heat is introduced into the first enclosed zone at a rate which is higher than it is introduced into the second zone, and the input of heat into the first zone is maintained at a rate which results in discharge of carbon black from the second zone at a temperature within the range of about 250°F. to about 300°F. In addition, the gases and vapors which result from heating of said mixture flow in a direction which is concurrent with respect to passage of carbon black through the enclosed zones for contact with the black prior to the discharge thereof from the outlet end of the second zone. A horizontally disposed rotary drum can be used to advantage as a treater having first and second enclosed heating zones.

To produce the presently claimed oxygenated blacks, the feedstock carbon black should have a particle size of at least about 15 millimicrons, a dibutylphthalate absorption (DBP) of no greater than 120 c.c./100 gms., a nitrogen surface area of at least 500 m²/gm., and a volatile content no greater than about 3 weight percent. When a feedstock having these characteristics is oxygenated in accordance with the method just described, the oxygen content can be elevated to at least 4 weight percent, more preferably to within the range of 6 to 16.5 weight percent, without any significant change in particle size. Even though there may be some loss in the DBP and surface area as a result of the treatment such is not detrimental to the presently claimed products so long as the final surface area is 450 m²/gm. or higher, the DBP is 60 c.c/100 gms or higher, and provided there is sufficient increase in the volatile to supply an oxygen content of at least 4 weight percent.

It has been observed that prolonged heating of the feedstock carbon blacks in the second enclosed heating zone at excessive temperatures in the presence of nitric acid vapors results in a substantial reduction in surface area and/or oxygen pick-up. It has been noted, for example, that when the black remains at 400°–450°F. in the second heating zone for about 30 minutes or longer, the surface area can be reduced by as much as 30–50%. In addition, temperatures in excess of 300°F. tend to minimize volatile uptake and hence hamper the pick-up of oxygen. It is thus preferable that the treated carbon black be discharged from the second enclosed heating zone at a temperature which is no greater than that required to assure recovery of an oxygenated product which is substantially free of moisture in a relatively short period of time, e.g. a discharge temperature of about 250°–270°F. The amount of residual moisture that can be tolerated in the treated black product is variable, but in the case of products intended for use in xerographic toner compositions it has been determined that the residual moisture content should not exceed about 2.5 weight percent, and more preferably, should be less than 1 weight percent, when determined in accordance with ASTM D1509-59.

The amount of aqueous nitric acid which can be mixed with the feedstock carbon black and heated in accordance with the present method is subject to considerable variation and depends, among other things, on the extent of oxidation desired and the concentration of nitric acid in the solution. For production of the presently claimed products a weight ratio of nitric acid to feedstock carbon blacck of about 1 to 1 or higher can be used to advantage. In addition, the ratio of feedstock carbon black to water in the acid solution can advantageously be within the range of about 0.8 to 1 or higher, and in no case should the ratio be such as to result in "mudding" or formation of a slurry of the carbon black in the acid solution.

Figure 3:
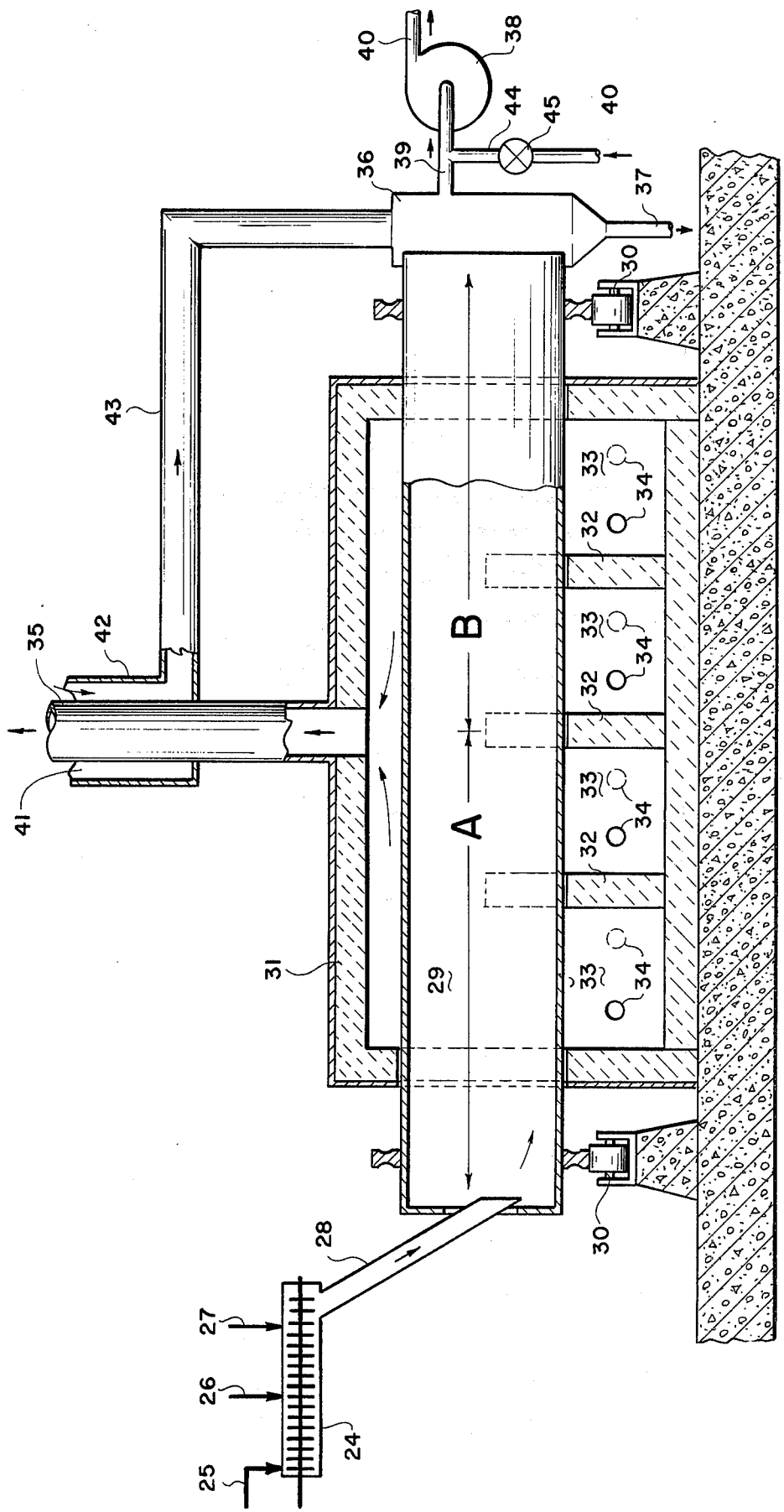
FIG. 3 depicts an apparatus arrangement that can be used when oxygenating carbon blacks when producing the presently disclosed products.

Referring to FIG. 3, feedstock carbon black, nitric acid and water are fed at a constant rate to a pin mixer 24 through lines 25, 26 and 27, respectively. Within the mixer 24, the carbon black and liquids are vigorously agitated to form a moist mixture which is fed from the mixer through a discharge line 28 into a rotary drum 29 which turns on rolls 30 located at each end thereof.

The drum 29 is enclosed over most of its length by means of an insulated shell, generally represented at 31. The lower part of the interior of shell 31 contains vertical partitions, represented at 32, which delineate spaces 33 into which burners represented at 34 discharge hot combustion gases for heating the drum. After the hot gases pass upwardly over the drum, they are discharged from the shell through conduit 35.

The two left spaces 33 constitute a first firing zone in order to effect a first enclosed heating zone A within the rotary drum 29. In like fashion, the two right spaces constitute a second firing zone in order to effect a second enclosed heating zone B within the drum. As shown in the drawing the outlet end of first zone A interconnects with the inlet end of second zone B of the drum. Firing of the burners 34 is controlled to permit independent regulation of the heat input into the two firing zones, hence permitting independent control over each of the heat input into zones A and B of the drum. Accordingly, heat can be introduced at a higher rate into zone A than into zone B, and the heat input into zone A can be altered so as to regulate the temperature at which treated carbon black is discharged from the drum. More particularly, maximum heat input can be to zone A while minimizing firing to zone B to simply maintain a minimum temperature at which the treated black is discharged from the drum. If a need arises for changing the temperature of the black discharged from the drum, heat input into heating zone A is regulated by changing the firing rate of the burners beneath it in the first firing zone.

Therefore, when the mixture of carbon black and nitric acid first enter drum 29, it is heated in zone A to a temperature which initiates evolution of gaseous nitrogen oxides and water vapor. As the black moves toward and through zone B of the drum the object is to maintain the lowest possible average temperature which will permit discharge of sufficient oxygen pick up by the black while at the same time evaporating water from the black to an extent which results in the necessary degree of dryness in the treated black. The dried and oxygenated black is ultimately discharged from the drum at the outer end of zone B and falls into a hood 36 which covers the end of the drum. Subsequently the treated carbon black is removed from the hood through discharge line 37 and is then cooled, pulverized and packaged.

As shown in FIG. 3, the flow of carbon black through the drum 24 is from the inlet end of the zone A to the outlet end of zone B. Nitrogen oxide gases and water vapor which are released from the carbon black-acid mixture in zone A move toward the outlet end of zone B and hence travel through the drum in the same direction as the carbon black. Movement of these gases and vapors in the desired direction is effected by means of blower 38 connected through suction line 39 to the hood 36 at the discharge end of the drum.

After being removed from the drum 29 by the blower the vapors and gases are discharged through line 40 to a furnace, not shown, wherein the nitrogen oxides are thermally dissociated to nitrogen and oxygen. Some of the air used for combustion in the furnace is drawn into the annular space 41 between conduit 35 and a surrounding conduit 42. This inspired air flows from the annular space into suction line 43 which also leads to blower 38, and is heated in the process by the heat given off by conduit 35, thus aiding the combustion in the furnace at the end of line 40. If even more air is needed at the furnace, or as an aid in controlling suction pressure, air can be supplied to the blower in controlled amounts through line 44 having a valve 45.

It should be noted that extraneous air is not introduced into the drum 24 during treatment of the carbon black, hence differentiating the present process from that disclosed in U.S. Pat. No. 3,226,244 wherein oxygen is introduced for reaction in the second zone of the treatment process. It should also be noted that thermal oxidation of the feedstock carbon black is not necessary prior to reaction with nitrogen oxides even though such preliminary oxidation is essential to the process described in U.S. Pat. No. 3,398,009.

EXAMPLES

Production of Feedstock Carbon Black

A furnace arrangement substantially the same as shown in FIGS. 1 and 2 was employed in the production of carbon black. The reaction chamber 1 had a diameter of 4.25 feed and a height of 12 feet. The diameter of the floor opening 8 was 14 inches. A typical analysis for the feedstock hydrocarbon used is shown below:

Feedstock Analysis

| API Gravity | 0.2 |
|---|---|
| Viscosity — SSU-130°F. | 594 |
| SSU-210°F. | 67 |
| Molecular Weight | 295 |
| Index of Refraction | 1.648 |
| % Sulfur | 1.06 |
| % Ash | 0.003 |
| % Carbon | 90.74 |
| % Hydrogen | 8.42 |
| % Benzene | 0.039 |
| % Asphaltenes | 0.05 |
| Average Boiling Point | 790°F. |
| UOP K Factor | 10.0 |

Experiment I

With the feedstock atomizer tip 14 centered in the floor opening 8 flush with the upper surface of the floor 7, the feedstock was injected into the furnace at a rate of 68 gallons per hour (60°F.), after having been preheated to a temperature of about 200°F. Air, preheated to 700°F., was injected into the furnace through floor opening 8 at the rate of 43,500 cubic feet per hour and through conduits 23 at the rate of 21,000 cubic feet per hour (60°F.). Water at 75°F. was fed to the atomizer tip at the rate of 19 gallons per hours, while the water atomizer tip was located 4 inches above the top surface of the furnace floor, 16 inches from the longitudinal center line of the feedstock sprayer 13 and the tip was directed perpendicularly toward the longitudinal center line. Atomizer tips 14 and 18 discharged a hollow cone of droplets at an angle of 60° and 80° respectively.

Potassium hydroxide was injected into the furnace to suppress formation of carbon black structure, being contained in the feedstock hydrocarbon stream, with 0.00182 lbs. of the KOH being introduced with each gallon of oil.

Throughout this particular run, the temperature in the lower section of the furnace was at about 2650°F., at about 2700°F. in the middle section, and at about 2300°F. in the upper section. It should be noticed that this is in contrast to the operating examples described in copending application, Ser. No. 316,200 wherein temperatures in the lower end of the furnace were maintained at about 2400°F. and at about 2500°–2600°F. in the upper section.

The carbon black aerosol which was discharged from the furnace in the present example was not quenched with water until it had traveled about 40 feet through the breeching 6 to the cooler, and at which point sufficient water was injected to reduce the temperature of the aerosol to about 450°F. Subsequently, the carbon black was recovered and tested and found to exhibit the following properties:

| Particle Size | 30 m$\mu$ |
|---|---|
| DBP | 115 c.c./100 gms. |
| Surface Area, $N_2$ | 575 m$^2$/gm. |
| Volatile Content | 1.4 weight percent |
| Oxygen Content | .84 weight percent |

Oxygenation of Carbon Black Feedstock

Using an apparatus arrangement which conformed generally to that shown in FIG. 3, the carbon black feedstock of the preceeding example was fed into the pin mixer at the rate of 177 lbs./hr. while 67.5% nitric acid and water were fed to the pelletizer at the rate of 171 and 183 lbs./hr., respectively. The mixture of carbon black and acid was discharged from the mixer and passsed into the heated rotary drum to effect evaporation of water and reaction of the black with decomposition products of the nitric acid. The drum was 30 feet long and had a diameter of 4 feet. The first half of the drum, toward the feed end, was the first enclosed heating zone and was heated to effect a drum skin temperature of about 575°–675°F. The second half of the drum, toward the discharge end, was the second enclosed heating zone and was heated to effect a drum skin temperature of about 275°–325°F. Firing rate to the first firing section was regulated to maintain the discharged carbon black to a temperature of 250°–270°F. Calculated residence time of the black in the drum during the oxygenation procedure was about 3 hours.

The oxygenated carbon black was allowed to cool following the recovery thereof and on testing was found to have the following properties:

| Particle Size | 30 m$\mu$ |
|---|---|
| DBP | 106 c.c./100 gms. |
| Surface Area, $N_2$ | 550 m$^2$/gm. |
| Volatile Content | 8.0 weight percent |
| Oxygen Content | 5.5 weight percent |
| Moisture Content | 0.6 weight percent |

The oxygenated carbon black of this example was utlized in the preparation of a xerographic toner and was found to impart better properties to the toner than a channel black which had previously been the toner black of choice. This channel black was characterized by the following properties:

| | |
|---|---|
| Particle Size | 12 mμ |
| DBP | 224 c.c./100 gms. |
| Surface Area, N$_2$ | 787 m$^2$/gm. |
| Oxygen Content | 8.1 weight percent |

It can thus be seen that the presently claimed oxygenated blacks are notably different from this channel black which was previously employed as the toner carbon of choice, most notably by a much higher DBP and a significantly lower particle size.

It will be apparent to those skilled in the art that such properties as particle size and DBP of the presently disclosed carbon black products can be fully regulated over the limits of the claimed ranges by means of known techniques, e.g. particle size can be regulated over the limits of the claimed ranged by means of known techniques, e.g. particle size can be regulated by varying the carbon black feedstock rate to the furnace wherein the feedstock blacks are produced, whereas DBP can be regulated by introduction of alkali metal salts with the carbon black feedstock in varied amounts. Surface area can be regulated by varying the flow rate of water stream 19 into the furnace and by regulation of temperature within the reaction chamber.

The relatively low volatile and oxygen content of the feedstock carbon blacks is incidental to their surface characteristics and the high temperatures at which they are formed. The amount of volatile and oxygen which is combined with the feedstock blacks through treatment to produce the oxygenated blacks can be regulated by varying the amount of oxygenating agent which is brought into contact with the black and the temperature of reaction during the treatment process.

While the present invention has been described with reference to particular properties, tests, process conditions, apparatus, applications of use, and the like, it will nonetheless be understood that even other embodiments which have not been specifically described will become apparent which are within the spirit and scope of the invention defined in the following claims.

What is claimed is:

1. An oxygenated furnace carbon black having a particle size of at least 15 millimicrons, a dibutylphthalate absorption value not exceeding 120 c.c./100 gms, a nitrogen surface area of at least 450 m$^2$/gm., and an oxygen content of at least 4 weight percent.

2. Furnace carbon black as in claim 1 having a volatile content of at least 6 weight percent.

3. An oxygenated furnace carbon black having a particle size within the range of 15 to 60 millimicrons, a dibutylphthalate absorption within the range of 60–120 c.c./100 gms., a nitrogen surface area within the range of 450 to 1000 m$^2$/gm., and an oxygen content of 4 to 10 weight percent.

4. A furnace carbon black as in claim 3 having a volatile content of 6.5 to 16.5 weight percent.

5. An oxygenated furnace carbon black having a particle size of about 25 to about 50 millimicrons, a dibutylphthalate absorption of about 80 to about 120 c.c./100 gms., a nitrogen surface area of about 500 to about 700 m$^2$/gm., and an oxygen content of about 5 to about 8 weight percent.

6. A furnace carbon black as in claim 5 having a volatile content of about 7 to about 13.5 weight percent.

7. An oxygenated furnace carbon black having a particle size of about 25 to about 35 millimicrons, a dibutylphthalate absorption of about 100 to about 120 c.c./100 gms., a nitrogen surface area of about 500 to about 600 m$^2$/gm., and an oxygen content of about 5 to about 7 weight percent.

8. A furnace carbon black as in claim 7 having a volatile content of about 7 to about 10.5 weight percent.

9. An oxygenated furnace carbon black having a particle size of about 30 millimicrons, a dibutylphthalate absorption of about 100 c.c./100 gms., a nitrogen surface area of about 500 m$^2$/gm., and an oxygen content of about 6 weight percent.

10. A furnace carbon black as in claim 9 having a volatile content of about 9.5 weight percent.

11. Method of producing a carbon black having a high surface area and a high oxygen content which comprises reacting an oxidizing agent with a previously unoxidized furnace carbon black which is characterized by:
   a. a particle size of at least 15 millimicrons,
   b. a dibutylphthalate absorption of no greater than 120 c.c/100 gms.,
   c. a nitrogen surface area of at least 500 m$^2$/gm.,
   d. a volatile content no greater than about 3 weight percent and wherein following the reaction of said oxidizing agent with said carbon black an oxygenated carbon black product is recovered that has a nitrogen surface area of at least 450 m$^2$/gm., an oxygen content of at least 4 weight percent, and a dibutylphthalate absorption of no less than about 60 c.c./100 gms.

12. A method as in claim 11 wherein the increased oxygen content of the recovered carbon black is oxygen derived through contact of the carbon black with ozone.

13. A method as defined in claim 11 wherein the increased oxygen content of the recovered carbon black is oxygen derived through contact of the carbon black with N$_x$O$_y$ where $x$ is from 1 to 2 and $y$ is from 1 to 4.

14. A method as in claim 13 wherein the carbon black is first mixed with nitric acid and is then heated to liberate N$_x$O$_y$.

15. A method as in claim 14 wherein the mixture of carbon black and nitric acid is heated at a temperature within the range of about 250°–300°F.

16. A method as in claim 14 wherein the ratio of carbon black and nitric acid, on a water-free basis, is about 1/1.

17. A method as in claim 14 wherein the nitric acid is in the form of an aqueous solution thereof wherein the concentration of nitric acid is at least about 50 weight percent.

18. A method as in claim 11 wherein the volatile content of the carbon black, prior to said combining with oxygen does not exceed about 2 weight percent and is at least about 6 weight percent following said combining with oxygen.

19. In a process wherein a carbon black is mixed with an aqueous solution of nitric acid for oxygenation of the black, and the resulting mixture is heated to drive off water and release one or more N$_x$O$_y$ compounds, the method for accelerated oxygenation and drying of the carbon black while perserving the surface area and maximizing oxygen content thereof which comprises passing said mixture through a first enclosed heating zone and then through a second enclosed heating zone that is in open communication with the first, introducing heat into both of said zones but at a higher rate into said first zone than into said second zone, the input of heat into said first zone being maintained at a rate which results in discharge of dried carbon black from said second zone which is at a temperature within the range of about 250°F. to about 300°F., and wherein gases and vapors which result from heating of said mixture flow in a direction which is concurrent with respect to passage of the carbon black through said zones for contact with said black prior to the discharge thereof from said second zone.

20. A process as in claim 19 wherein the carbon black that is mixed with the nitric acid is characterized by:

a. a particle size of at least 15 millimicrons, b. a dibutylphthalate absorption of no greater than 120 c.c./100 gms., c. a nitrogen surface area of at least 500 m$^2$/gm., d. a volatile content no greater than about 3 weight percent, and wherein the dried oxygenated carbon black product that is recovered has a nitrogen surface area of at least 450 m$^2$/gm., an oxygen content of at least 4 weight percent, and a dibutylphthalate absorption of no less than about 60 c.c./100 gms.

21. A process as in claim 19 wherein the carbon black is dried to a moisture content (ASTM D1509-59) of not exceeding about 2.5 weight percent.

* * * * *